United States Patent
Smitt

(10) Patent No.: US 10,211,939 B2
(45) Date of Patent: Feb. 19, 2019

(54) APPARATUS AND A METHOD FOR DETERMINING A POINT IN TIME

(71) Applicant: Napatech A/S, Søborg (DK)

(72) Inventor: Nicolai Asbjørn Smitt, Copenhagen Ø (DK)

(73) Assignee: Napatech A/S, Søborg (DK)

( * ) Notice: Subject to any disclaimer, the term of this patent is extended or adjusted under 35 U.S.C. 154(b) by 211 days.

(21) Appl. No.: 14/900,001

(22) PCT Filed: Jun. 27, 2014

(86) PCT No.: PCT/EP2014/063763
§ 371 (c)(1),
(2) Date: Dec. 18, 2015

(87) PCT Pub. No.: WO2014/207237
PCT Pub. Date: Dec. 31, 2014

(65) Prior Publication Data
US 2016/0142167 A1 May 19, 2016

(30) Foreign Application Priority Data
Jun. 27, 2013 (EP) .................................... 13173996

(51) Int. Cl.
*H04J 3/06* (2006.01)
*H04L 7/00* (2006.01)
*G06F 5/06* (2006.01)

(52) U.S. Cl.
CPC ................. *H04J 3/06* (2013.01); *G06F 5/065* (2013.01); *H04J 3/0697* (2013.01); *H04L 7/005* (2013.01); *G06F 2205/067* (2013.01)

(58) Field of Classification Search
CPC ........... H04J 3/06; H04J 3/0697; G06F 5/065; G06F 2205/067; H04L 7/005
See application file for complete search history.

(56) References Cited

U.S. PATENT DOCUMENTS

| 6,594,329 B1 | 7/2003 | Susnow |
| 7,324,403 B2 | 1/2008 | To et al. |

(Continued)

FOREIGN PATENT DOCUMENTS

WO   WO2009121421   10/2009

OTHER PUBLICATIONS

Loschmidt, P. et al, "Limits of synchronization accuracy using hardware support in IEEE 1588", ISPCS 2008, International Symposium on Precision Clock Synchronization for Measurement, Control and Communication, p. 12,16, 22-26, (See p. 15, "B. Time Stamp Accuracy"), (Sep. 2008).

*Primary Examiner* — Saba Tsegaye
(74) *Attorney, Agent, or Firm* — McHale & Slavin, P.A.

(57) ABSTRACT

Forwarding points in time of a clock over a clock boundary is performed by launching the points in time into a buffer, such as a FIFO, in the first clock domain. The oldest point in time is fed into a FIFO or delay line in the other clock domain, which FIFO or delay line comprises a plurality of received points in time, which are shifted through the FIFO or delay line over time. An estimate of a point in time in the second clock domain is derived from a plurality of the points in time in the delay line/FIFO, such as from a mean value thereof. This point in time may be compensated for a known delay in order for this determined point in time to be identical to or close to an actual point in time of the first clock in the first clock domain.

14 Claims, 2 Drawing Sheets

(56) References Cited

U.S. PATENT DOCUMENTS

| | | | |
|---|---|---|---|
| 9,001,951 B1* | 4/2015 | Kumpulainen | H04L 25/38 |
| | | | 327/147 |
| 2006/0129350 A1 | 6/2006 | West | |
| 2009/0276542 A1 | 11/2009 | Aweya et al. | |
| 2011/0035518 A1* | 2/2011 | Wang | G06F 5/14 |
| | | | 710/52 |
| 2012/0106576 A1 | 5/2012 | Hadzic | |
| 2013/0077642 A1 | 3/2013 | Webb, III et al. | |
| 2013/0254583 A1* | 9/2013 | Rifani | G06F 1/12 |
| | | | 713/400 |
| 2016/0035409 A1* | 2/2016 | Gopalan | G11C 11/4076 |
| | | | 365/193 |

* cited by examiner

APPARATUS AND A METHOD FOR DETERMINING A POINT IN TIME

CROSS REFERENCE TO RELATED APPLICATIONS

This is a national stage filing in accordance with 35 U.S.C. § 371 of PCT/EP2014/063763, filed Jun. 27, 2014, which claims the benefit of the priority of European Patent Application No. 13173996.3, filed Jun. 27, 2013, the contents of each are incorporated herein by reference.

FIELD OF THE INVENTION

The present invention relates to a manner of transferring a point in time from one clock domain to another clock domain. Often, data packets are received in one clock domain but are to be time stamped in accordance with a clock signal of the other clock domain.

BACKGROUND OF THE INVENTION

Often, systems of this type are seen in Physical Layer Devices (usually denoted PHY), which are configured to receive and transmit Ethernet data from a physical medium, such as an electrical or optical cable.

In devices of this type, the data received is usually controlled and timed by the transmitter, whereby the timing is independent on the systems configured to receive and process the received data. A clock boundary is present in the Phy: two parts thereof operate on independent clocks.

Systems and solutions of this type may be seen in: P. Loschmidt et al.: "Limits of synchronization accuracy using hardware support in IEE 1588", September 2008, WO2009/121421, US2009/0276542, US2013/0077642, US2006/129350, US2012/106576, U.S. Pat. No. 7,324,403 and U.S. Pat. No. 6,594,329.

SUMMARY OF THE INVENTION

In a first aspect, the invention relates to an apparatus comprising:
  a first buffer,
  a first clock, the first clock being configured to update the buffer with a point in time of the first clock,
  a FIFO having a plurality of storage locations,
  a processor configured to transfer the point in time of the buffer to a storage location in the FIFO and derive, from the contents of a plurality of the storage locations in the FIFO, a second point in time.

In this context, an apparatus may be a single system of interconnected elements positioned within a single housing, such as on the same PCB. However, the apparatus may be a distributed system of elements provided in separate housings at separate locations and configured to communicate with each other, such as via a LAN, WAN, the Internet or the like—wirelessly, via wires or a combination thereof.

A buffer, in this context, is one or more addressable storage locations which may receive data and from which data may be read. The buffer may be a single storage location able to store a single piece of data, such as a point in time, or the buffer may comprise a plurality of storage locations each independently addressable and which may store independent data items. One type of buffer a discrete register, a flip flop, one or more addresses in RAM, SRAM, SDRAM, PROM, EPROM, EEPROM, hard drive, flash disc or the like. A buffer may, if comprising a plurality of storage locations, may be implemented in a number of manners, such as a delay line, a FIFO, a linked list, a circular list, or the like.

The first clock is an element which has a value, the point in time, which varies over time, such as a value or number which regularly alters its value. Usually, the value will increase a predetermined amount per unit of time, such as each week, day, hour, minute, second, ms, ns and/or the like. Often, a clock has a device outputting a timing signal, such as a crystal or the like outputting a high frequency signal which by the clock is down divided or otherwise used to define when the value of the clock is altered the predetermined amount.

Alternatively, the clock may have a receiver for receiving a timing signal.

The point in time of the clock may be a universal point in time, such as year, month, date, hour, minute, second, ms, ns or the like, where the point in time resembles that used in watches, cell phones or the like. Alternatively, the point in time may be an integer, which is increased each clock cycle or clock period. Usually, this integer is allowed to wrap around (start over) when having reached a maximum value.

The buffer is updated with an actual point in time of the clock. Again, this value may be an hour:minute:second:ms:ns value or simply an integer. The actual point in time is derived from the clock and fed to the buffer.

The clock may be operable to feed the value to the buffer, or a processor or other controller of the assembly may be operable to do so.

A FIFO is a memory type where the first data to be received is the first data to be read out or deleted. A FIFO does not necessarily have a constant number of addresses or storage units therein. A FIFO may be implemented as a delay line, as data will enter a delay line at one end thereof, be shifted along the delay line and will be output from the delay line in the order of receipt. A delay line usually has a fixed length and thus a fixed number of positions which always comprise data. All data is shifted in a delay line only when new data is available for introduction therein.

A FIFO may in principle have any number of positions taken up, whereby a delay (when clocked constantly) through a FIFO may vary.

Thus, when a FIFO of this type is used, it may either be desired that the FIFO always is full (delay line), or it may be desired to take into account, in the determination of the point in time, the number of data positions taken up in the FIFO. This is especially interesting in the below compensation for a delay between an actual point in time of the first clock and the actual value of the second point in time.

A FIFO or delay line may be implemented in any of a variety of manners, such as a linked list, but also a number of storage locations or addresses in a RAM or a Flash memory, for example, combined with information identifying the order of the data in the individual addresses, so that the overall functionality is obtained even though the data is stored more randomly in a storage.

The processor may be any type of controller, software controlled, hardwired or a combination thereof. The processor may be, or form part of, an ASIC, a FPGA or the like. This processor may also handle the storing in and removing of data from the FIFO. The processor may be distributed and be formed of individual elements, such as an element handling the transfer and another element handling the deriving of the second point in time.

The contents of the FIFO is a plurality, such as 2, 3, 4, 5, 6, 7, 8, 9, 10, 15, 20, 30 or more, 40 or more, 50 or more, 75 or more, 100 or more, 500 or more, points in time received from the first clock.

The processor may derive the second point in time in a number of manners. A simple manner is to derive a mean value or median value of the contents of the FIFO. Another manner is to derive a mean value or median value of only part of the contents of the FIFO, such as the newest and the oldest points in time (first and last data) in the FIFO.

A very simple manner is then to have the FIFO have $2^N$ entries, where N is an integer. Then, the generation of the mean value may simply be to add all the values of the FIFO and right shift the binary value N times or bits. The sum may be maintained by adding, to the "old" sum, the new, updated value transferred to the FIFO and subtracting the value being removed in the same instance.

More complex analyses may be performed in which weights are derived for individual points in time in the FIFO, where the weights are then taken into account in the deriving of the second point in time. The weights may be multiplied on to the points in time, for example. The weights may be derived from an analysis of the credibility of the respective point in time, such as from an analysis of an estimate of time jitter in or at the actual point in time.

A particular situation is seen when the first clock experiences an abrupt shift in point in time. This may be due to daylight savings time or other corrections which causes the point in time of the first clock to change abruptly. This will have an effect on the determined second point in time, as the FIFO will subsequently have one or more points in time from before the change and one or more points in time from after the change. This may be detected, or an operator may inform the system of this change, whereby the weighting of the points in time of the FIFO may be selected to handle this situation. This is described in more detail below.

The second point in time may not correspond to the actual value of the first clock, as the second point in time is determined from several, more or less historic, points in time. However, as the present method acts to even out time jitter, a time delay through the system may be determined, and the second point in time may be corrected by a factor in order to be identical to or close to the actual point in time of the first clock. This delay may be determined from clock frequencies of the first clock, a second clock or other element timing or controlling the transfer and the number of positions or storage positions in the FIFO. Another manner is to simulate the setup and the behaviour of the data flow and therefrom determine a delay factor. Compensation may also be made for dynamic deviations in nominal clock frequencies, such as if a clock has a frequency deviating from its expected value.

In one embodiment, the apparatus further comprises a second clocking signal, such as of a second clock, the processor being controlled by the second clocking signal. This controlling may be a clocking, whereby the operations of the processor are timed by a signal output by the second clock.

Often, the first and second clocks run independently of each other, whereby the changing of the values (points in time if the second clocking signal relates to a clock) will be independent, whereby the updating of the values (points in time) take place independently of each other. Also, the clocks/clocking signals may operate at different frequencies or phases if desired.

In this manner, when different parts of the apparatus are controlled by different clocks/clocking signals, a clock boundary will be present, and data transfer, and especially timing information, over clock boundaries always is a challenge. This challenge is met by the present invention.

In one embodiment, the first clock is configured to regularly update the buffer. This updating may take place each time the first clock changes its value, i.e. with the frequency of the first clock. Alternatively, the updating may take place less often, such as at a predetermined fraction of the frequency of the first clock, such as every 2, 3, 4, 5, 6, 7, 8, 9, 10 times the first clock changes its value. The more often the updating takes place, the more updated data is transferred.

The first clock may output or itself be controlled by a first clocking signal which may also be used for controlling the timing of other circuits, such as processors/processes or the like.

In one embodiment, the processor is configured to regularly transfer the point in time from the buffer to the FIFO.

This transfer frequency will, together with the update frequency, determine how often updated values are transferred to the FIFO.

The transfer frequency may be controlled by external events, such as receipt of data or the like (see below), or it may be determined by the update frequency, so that data is transferred when the buffer is updated.

Alternatively, the transfer frequency may be regular and controlled by e.g. the above-mentioned second clock/clocking signal or another regular timing source.

The transfer of data to the FIFO preferably is accompanied by a removal of the oldest data in the FIFO. Especially when the FIFO is implemented as a delay line, data is removed when new data is introduced. The delay line is always full, apart from start-up where it may require a period of time to fill.

In one embodiment, the apparatus further comprises a receiver for receiving data packets and forwarding at least part of a received data packet along with a second point in time derived when receiving the data packet. In this situation, the apparatus derives the second point in time and utilizes it as a time stamp correlated to the first clock.

In this manner, data packets received by the receiver may be time stamped in a controllable manner and with reference to the first clock, so that the relative point in time of receipt of data packets may be relied on in analysis, transmission or the like of the packets.

In addition, the receiver may be configured to derive a clocking or timing signal from the received data packets and use this timing signal for controlling the processor, for example. The second clock/clocking signal may be constituted by this receiver, and/or the second clock may be controlled by this clocking signal.

An advantage of the invention is that time jitter, which will occur on the boundary between the buffer and the FIFO (the clock boundary) will be evened out. If, when removal/introduction is to take place, no new time value has been received in the buffer, the old clock time may simply be used. This error, however, is reduced considerably due to the deriving of the second point in time from the e.g. mean or sum of the values in the FIFO.

A challenge may be to ensure that the buffer is fully updated and stable, before it is read to transfer the point in time to the FIFO. This may be handled in a number of manners, such as the providing of a toggle signal for the buffer, where the system updating the buffer will, using the toggle signal, indicate that the buffer cannot be read, where the toggle signal is then altered, when the buffer again is stable.

Another manner is to implement the buffer as a second FIFO, as circuits of this type has a built-in stability against this type of situation. When this second FIFO is full, it may be preferred that no updated points in time from the first clock are entered. When a point in time is read from the second FIFO, it may be deleted and the contents shifted, and when the second FIFO would be empty, if the last value was deleted, this value may be maintained in the second FIFO and re-read at the next update(s), until a new point in time is received from the first clock.

In one embodiment:
the first clock is configured to output, over time, a repetitive and/or periodic sequence of values,
a third clock, a second buffer and a third buffer are provided,
a first event detector is configured to detect a first periodic event of the values of the first clock and facilitate the storing in the second buffer of a point of time of the third clock when the first periodic event is detected,
a second event detector is configured to detect a second periodic event of the second point in time and/or the contents of the plurality of storage locations in the FIFO and to transfer the point in time of the second buffer to the third buffer,
where the processor is configured to derive a fourth point in time from the second point in time and the point in time of the third buffer.

Naturally, the third clock may be configured to store the point in time thereof in the second buffer when instructed to do so by the first event detector.

As mentioned above, the second and third buffers may be implemented as FIFOs, which is one manner of ensuring that the data is stable when read out. The overall delay from storing the point in time of the third clock in the second buffer and until it is available from the third buffer may be determined as mentioned both above and below, so that the fourth point in time may be determined or corrected to simultaneously be more or less identical to the point in time of the third clock.

As is described below, the periodic or repetitive sequence of values typically is an increasing value which wraps around (reduces to a lowest value, typically zero) and then resumes its increasing. The incrementing may be an incrementing by 1 or a larger value. Often, the points in time are represented as integers, often as binary numbers.

The first event detector may detect a wrapping around of the value of the first clock or of a part thereof, such as a predetermined number of digits (such as bits) thereof— usually the least significant digits/bits.

Other events may be the exceeding/equating or falling below a predetermined value of the first clock.

The second event detector may also detect a wrapping around of the contents of the storage locations and/or the second point in time.

The second event detector also detects the event of a periodic event. The contents of the storage locations may be summed, averaged or the like, and the result of this mathematical operation or function will be periodic or repetitive, when the values added to the FIFO are.

Thus, the same types of events may be detected by the second event detector. Naturally, the types of events detected by the first and second event detectors may be the same or different.

The deriving of the fourth point in time may be any mathematical operation involving the second point in time and the point in time of the third buffer. The second point in time may be determined more often than the detection of the second event. Thus, the second point in time may be e.g. added to the point in time of the third buffer to generate a value which alters as often as the second point in time. This provides a point in time with a larger resolution than the updating of the point in time of the third buffer. This is explained further below.

Another aspect of the invention relates to a method of deriving a point in time, the method comprising.
a) updating a buffer with a point in time of a first clock,
b) transferring the contents of the buffer to a storage location in a FIFO having a plurality of storage locations and
c) deriving the point in time from the contents of a plurality of the storage locations in the FIFO.

As mentioned above, the updating of the buffer is with a value currently held by the first clock. This value may be an integer or any other type of data, such as a month:date:hour:minute:second:ms:ns value if desired. The first clock preferably will alter the point in time regularly, and the manner of updating the point in time is so that it may be determined which of two different points in time is the earliest.

The buffer may be overwritten, so that older data is discarded, or different positions of multiple storage positions may be used, if an indication, such as a pointer, is used indicating which storage location holds the most updated point in time.

The contents of the buffer are transferred into the FIFO which is a storage implementation where, when new data is introduced, the oldest data is discarded or read out. The FIFO may have any number of storage locations and may also be implemented as a delay line. Usually, a FIFO has a fixed number of storage locations or positions.

The deriving of the point in time may be performed in a number of manners. When using several, such as 2, 3, 4, 5, 6, 7, 8, 9, 10, 15 or more, 20 or more or all storage locations in the FIFO, time jitter between the first clock and the point in time may be reduced.

As mentioned above, a large number of manners exist of determining the point in time from the contents of the FIFO.

The simplest manner is one where step c) comprises deriving the point in time as a mean value of the points in time of the FIFO.

This mean value may be calculated as a sum of the contents of the FIFO, or at least the storage locations of interest, and diving by the number of storage locations. When the number of storage locations used is $2^X$, the dividing may simply be a binary right shift of X bits.

The sum may be maintained by adding the newest value upon transfer and subtracting the oldest, discarded value from the FIFO, if these storage locations take part in the determination of the point in time.

As mentioned above, a correction of the second point in time may be made in order for it not to be lower than the actual point in time of the first clock.

In one embodiment, step a) is controlled by the first clock. Thus, this may be a regular updating of the buffer, such as each time the first clock changes its value.

In one embodiment, steps b) and c) are controlled by a second clocking signal. As mentioned above, this may mean that a clock boundary is provided between the buffer and the FIFO.

The transfer may thus also be performed regularly.

The second clocking signal may be derived from a second clock, or the method may further comprise the step of receiving a signal and deriving therefrom the second clocking signal.

One manner of receiving a signal is to receive a data packet. Often in communication, the transmitter transmitting the data will do this in accordance with an internal clock. The receiver then will be able to derive a periodic clocking signal from the data received.

In one embodiment, the method further comprises the step of receiving a data packet and forwarding at least part of the data packet with a point in time derived when receiving the data packet. Thus, the second clocking signal may be derived from this reception. Also, the point in time may be used as a time stamp.

In one embodiment, the method further comprises the steps of
the first clock outputting, over time, a repetitive and/or periodic sequence of values,
the providing of a third clock,
a detection of a first periodic event of the values of the first clock and the storing in a second buffer of a point of time of the third clock,
a detection of a second periodic event of the second point in time and/or the contents of the plurality of storage locations in the FIFO and the transfer of the point in time of the second buffer to a third buffer, and
the deriving of a fourth point in time from the second point in time and the point in time of the third buffer.

As mentioned above, the providing of the value of the third clock to the second buffer is controlled by the detection of the event.

The transfer of the value from the second to the third buffer, i.e. over the clock boundary, is controlled by the detection of the other event.

The generation of the fourth point in time may be a sum of the point of time of the third buffer and the second point in time. Other mathematical operations involving the two values may be contemplated, such as an averaging, a subtraction, a division, a multiplication or the like.

BRIEF DESCRIPTION OF THE FIGURES

In the following, preferred embodiments of the invention will be described with reference to the drawing, wherein.

DETAILED DESCRIPTION OF THE INVENTION

Figure 1:
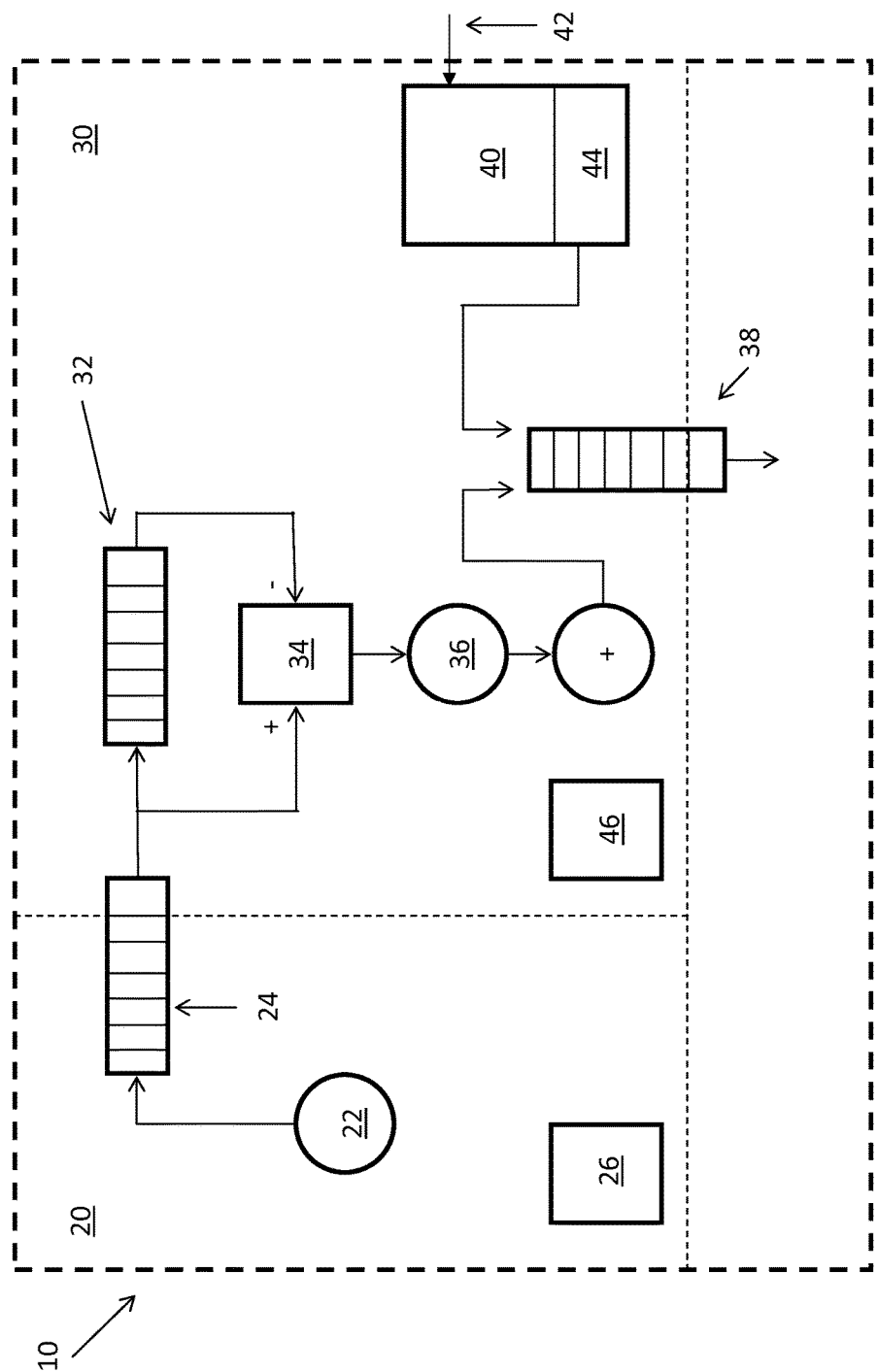
FIG. 1 illustrates the most relevant building blocks of a system according to the invention and
FIG. 2 illustrates another embodiment according to the invention.

In FIG. 1, a system 10 is seen which has two clock domains, the Time Sync Domain 20 and the Phy Domain 30. The Time Sync Domain is controlled by a master time or clock 22, which feeds its present point in time to a buffer 24.

In one embodiment, the buffer 24 is implemented, as illustrated, as a FIFO having a number of buffer positions, so that when a new point in time is fed into the FIFO, the oldest point in time is automatically deleted.

In another embodiment, the buffer 24 has only a single value (point in time) which is replaced, when the clock 22 overwrites the value with an updated point in time.

As mentioned above, the buffer 24 may be implemented as a FIFO in that this automatically handles the situation seen in a single buffer, the contents of which are not reliable during and shortly after loading data thereto.

In the Phy Domain 30, the (oldest) value of the buffer 24 is read and fed into a delay line 32 in which a plurality of points in time are held. When a new point in time is transferred to the delay line 32, the oldest point in time is deleted.

In the Phy domain, a mean value is calculated of the points in time of the delay line. This mean value may be determined in any of a number of manners, but a simple manner is to maintain a sum of all values in the delay line 32. The sum circuit 34 is added the updated point in time received from the buffer 24 and subtracted the oldest point in time removed from the delay line 32. Subsequently, this sum is divided (divider 36) by the number of values or positions in the delay line 32. A suitable number of values in the delay line 32 is $2^X$, where X is an integer, whereby the division may be a simple binary right shift, where the sum is right shifted X bits.

The resulting point in time may then be used in the Phy Domain to e.g. time stamp received data packets in order to correlate the point in time of receipt to the master clock 22. However, clearly, a time delay exists between the so determined point in time and the present point in time of the master clock 22. This delay may be estimated and will depend on the number of positions in the delay line, among other things.

This delay may be added (compensated for) to the point in time determined either after the divider 36 (at the "+" circuit) or after the sum circuit 34, for example.

In FIG. 1, the point in time derived is subsequently fed to a time stamp FIFO 38 together with data representing a data packet received by a Phy 40 from a link 42, where the Start Of Frame or End Of Frame is detected by a SOF/EOF detector 44. Thus, the data packet is time stamped with a point in time derived from and corresponding to the present point in time of the master clock 22.

It is noted that it may be more important to have a precise, relative time stamping of received data packets, whereby the delay compensation may not be required.

The master clock 22 may update the buffer 24 each time it shifts, and/or every time a position is available in the buffer 24 if implemented as a FIFO.

The transfer of the contents of the buffer 24 to the delay line 32 may take place each time a Phy clocking signal shifts. The Phy 40 usually is configured to derive a clocking signal from the signal received on the link 42. This signal may be used for controlling a Phy clock or may itself be used as a Phy clock.

Then, the transfer may be controlled by the clocking signal derived from the link 42.

Naturally, the updating of the buffer 24 and the transfer of data may be controlled in other manners or more often or less often than the shifting of the master clock and/or Phy clock.

A processor 26 may be present in the Time Sync Domain 20 to control the updating of the buffer 24. This processor may be controlled by the master clock 22, if desired.

Also, a processor 46 may be provided for controlling the operation of in the Phy Domain 30, such as the calculation illustrated by sum circuit 34, divider 36, the transfer of points in time from the buffer 24 to the delay line 32, etc. This processor may be controlled or timed by the Phy clock, if desired.

By the operation of the FIFO 32, a smoothed clock is obtained which may have as high a precision as the clock 22 and which is updated with the frequency of the Phy clocking signal. Thus, in fact, the points in time of the second clock may be fractional points in time (non-integers) when the Phy clocking signal is asynchronous to the clocking signal of the clock 22.

In a particular situation, it may be desired to allow the master clock 22 to abruptly change its point in time more than the usual time increment. This may be the situation if the apparatus 10 is moved between time zones, at daylight savings time or when the clock 22 simply needs to be adjusted.

Assume that the master clock 22 is incremented by a period of time of X, in addition to its normal time increment.

In that situation, the points in time in the FIFO 32 will over time also receive values which are X larger, and during a time interval, the FIFO 32 will have points in time both with and without the X shift.

In order to take this situation into account, different solutions are available. In one situation, the points in time may simply be allowed to flow into the FIFO. The determined point in time thus will, as the new (+X) points in time fill the FIFO, increase with a rate exceeding that of the master clock 22 and eventually reach a situation as before the increase, where the second points in time now again follow the points in time of the master clock 22.

In another situation, it may be desired to have the second points in time experience the same abrupt shift in point in time. This may be obtained by the operator simply informing the processor 46 or the compensation circuits of the Phy Domain of the value X. This value may then be used, such as in the sum circuit 34 or the delay compensation 36 to ensure that the second point in time is correct. In the sum circuit 34, for example, a value may be added being X times the number of points in time in the FIFO from before the X shift. This value will change over time, as the number of points in time from before the (+X) shift decreases.

Alternatively, the pre-shift values of the FIFO may be added the X factor in order for the sum and compensation to be unaffected by the shift.

In other situations, the abrupt shift may be detected, such as by the processor 46, if the points in time received from the buffer 24 suddenly are much higher than expected. In that situation, X may be determined or estimated, whereby the above compensation again may be performed.

Naturally, X may also be negative, but the compensation may be exactly the same.

At start-up, the values of the FIFO 32 usually will be initialized to a value, such as zero, whereby the initial receipt of points in time in the FIFO 32 will also represent an abrupt shift, which may be taken as the above shift and handled accordingly.

Figure 2:
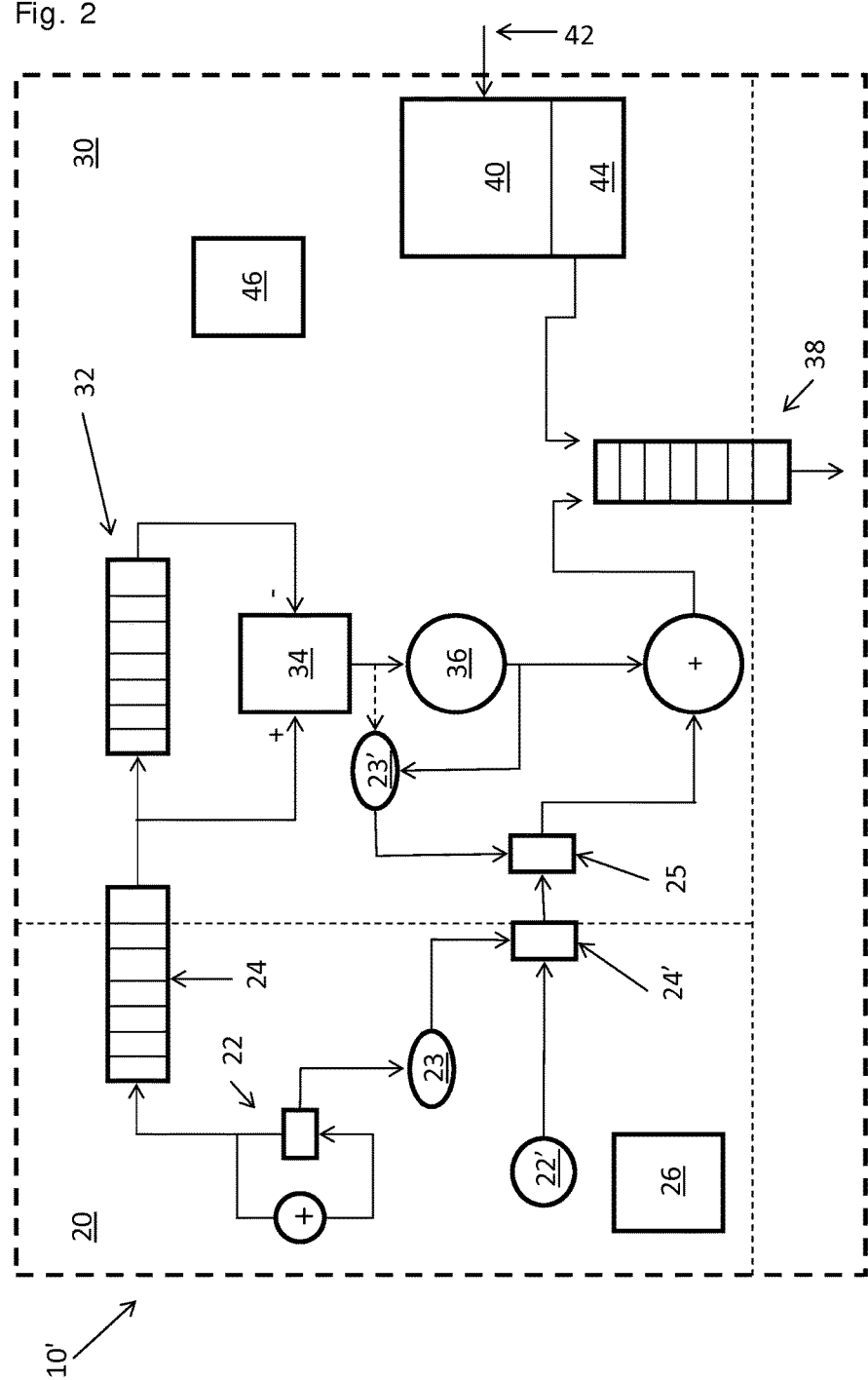

In FIG. 2, a system 10' is illustrated where the elements in common with the system 10 of FIG. 1 have the same numerals. The handling of the abrupt time shift is handled in an alternative mariner in this embodiment.

In FIG. 2, the clock 22 is a precise free-running clock having a periodic incrementation ("+" element) of a point of time held in a register (square) outputting this value to the buffer 24 and then to the delay line 32.

A detector 23 is provided which outputs a signal when a predetermined, periodic event is seen in the register of the clock 22. This event may be a wrap around (value in the register of clock 22 shifts from the maximum to the minimum value). Other events may be that a particular point in time or value is present in this register or a predetermined value is exceeded, for example.

The periodic event is one which takes place periodically in relation to the values of the register, such as once per wrap-around of the values therein.

An additional clock 22' is provided in the clock Time Sync Domain 20, where the clocks 22 and 22' may have the same frequency and the same phase but usually have at least different phases.

The time or value of the clock 22' is fed to a register or buffer 24', when the event is detected by the sensor 23, from where it may be fed to an additional register or buffer 25 and thus be available in the Phy Domain 30. Abrupt changes in the time of the clock 22' will automatically be fed to the buffers 24' and 25.

Another event detector 23' is provided which analyzes the contents of the delay line 32, such as the output of the sum 34 or the divider 36. The event detected by the detector 23' preferably is a periodic event, such as the output of the divider exceeding, equating or falling below a predetermined value, the output of the sum 34 exceeding, equating or falling below a predetermined value, or the like. Another type of event is a wrap around of a portion of the output, such as one or more less significant digits, bits, values or the like of the complete output of the sum/divider. This is described further below.

Again, the period of the periodic event preferably is identical to that of the period of the event detected by the detector 23.

Thus, when the detector 23' outputs its signal, the point in time of the buffer 24' is fed or latched into the buffer 25 and is now available in the Phy domain 30.

A further interesting improvement is one where the frequencies or rates of the clock 22' (the frequency with which it increments its value) and that of the timing signal (the "+") of the clock 22 are identical. In that situation, the output of the divider 36 may be added to the point in time of the buffer 25 to give a clock which has the same precision as the clocks 22/22' and which has the above advantages.

In a particularly interesting embodiment, the number of positions in the delay line 32 is $2^N$ where N is an integer. In this situation, the register of the clock 22 has X>N bits and the detector 23 is configured to detect a wrap around of the contents of the buffer—but without the leftmost N bits in that register. Thus, the wrap around detector 23 detects wrap around of the X−N least significant bits. The detector 23 will now detect wrap around $2^N$ times more often than the full contents (all X bits) of the register.

The full contents (all X bits) of the register are fed to the buffer 24 and the delay line 32, but the output of the sum 34 and/or the divider 36 is limited again to the X least significant bits. Naturally, when summing the N values (X bits) of the delay line 32, the result may be more than X bits. The selection of the X least significant bits thus has the same overall function as the X−N least significant bits fed to the detector 23. Thus, the detector 23' may be used for detecting wrap around of the X bits output of the divider 36 (or the output of the sum 34).

This last embodiment has the advantage of being extremely simple to build in digital electronics, as the selection of X−N bits in an X bit wide buffer simply is the deriving of the required bits. No arithmetic is required. N may be 7 and X 16, 24, 32, 64, 128, 256 or more.

In another interesting embodiment, the advancing of the value of the incrementer of the clock 22 may not be an increment of 1. In some embodiments, the incrementing of the value may be more than one, such as 3. In that situation, the detection of wrap around of the detector 23 may be a detection of when the last X−N bits of the buffer represent the value of 0, 1 or 2. Clearly this brings about a varying offset when this value is added to the contents of the buffer 25, when this value has travelled to the buffer 25.

This may be compensated for by simply subtracting the value of the clock 22' when latching this value into the buffer 24'. This may be obtained by replacing the illustrated buffer 24' with a two buffers and a subtractor, where the value of the clock 22' is firstly stored in a first of the buffer (not illustrated) and read therefrom to the subtractor when the detector 23 outputs its signal. At the same time, the value of the X–N bits of the register of the clock 22 are fed tot eh subtractor and are subtracted from the point in time stored in the first buffer. The result of the subtraction is fed to the second buffer from where the value may be transferred to the buffer 25.

The present manner of transporting points in time over a clock boundary from a first clock domain to a second clock domain is illustrated in the situation where the points in time are used for time stamping packets received in the second clock domain. Naturally, the transported points in time may be used for other purposes, such as for controlling an outputting of data packets to be in accordance with a timing schedule or the like.

The invention claimed is:

1. An apparatus comprising:
    a first buffer,
    a first clock, the first clock being configured to update the buffer with a point in time of the first clock,
    a FIFO having a plurality of storage locations,
    a processor configured to transfer the point in time of the buffer to a storage location in the FIFO and derive, from the points in time of a plurality of the storage locations in the FIFO, a second point in time.

2. An apparatus according to claim 1, further comprising a second clocking signal, the processor being controlled by the second clocking signal.

3. An apparatus according to claim 1 wherein the first clock is configured to regularly update the buffer.

4. An apparatus according to claim 1, wherein the processor is configured to regularly transfer the point in time from the buffer to the FIFO.

5. An apparatus according to claim 1, wherein the second point in time is derived as a mean value of the points in time of the FIFO.

6. An apparatus according to claim 1, further comprising a receiver configured to receive data packets and forward at least part of a received data packet along with a second point in time derived when receiving the data packet.

7. An apparatus according to claim 1 wherein:
    the first clock is configured to output, over time, a repetitive and/or periodic sequence of values,
    a second clock, a second buffer and a third buffer are provided,
    a first event detector is configured to detect a first periodic event of the values of the first clock and facilitate the storing in the second buffer of a point of time of the second clock when the first periodic event is detected,
    a second event detector is configured to detect a second periodic event of the second point in time and/or the contents of the plurality of storage locations in the FIFO and to transfer the point in time of the second buffer to the third buffer,
where the processor is configured to derive a fourth point in time from the second point in time and the point in time of the third buffer.

8. A method of deriving a point in time, the method comprising:
    a) updating a buffer with a point in time of a first clock,
    b) transferring the contents of the buffer to a storage location in a FIFO having a plurality of storage locations; and
    c) deriving the point in time from the points in time of a plurality of the storage locations in the FIFO.

9. A method according to claim 8, wherein step a) is controlled by the first clock.

10. A method according to claim 8, wherein steps b) and c) are controlled by a second clocking signal.

11. A method according to claim 10, further comprising the step of receiving a signal and deriving therefrom the second clocking signal.

12. A method according to claim 8, wherein step c) comprises deriving the point in time as a mean value of the points in time of the FIFO.

13. A method according to claim 8, further comprising the step of receiving a data packet and forwarding at least part of the data packet with a point in time derived when receiving the data packet.

14. A method according to claim 8, further comprising the steps of:
    the first clock outputting, over time, a repetitive and/or periodic sequence of values,
    the providing of a second clock,
    a detection of a first periodic event of the values of the first clock and the storing in a second buffer of a point of time of the second clock,
    a detection of a second periodic event of the second point in time and/or contents of the plurality of storage locations in the FIFO and the transfer of the point in time of the second buffer to a third buffer, and
    the deriving of a fourth point in time from the second point in time and the point in time of the third buffer.

* * * * *